Aug. 10, 1926. 1,595,311
P. MUELLER
COMBINATION LAVATORY FAUCET
Filed August 21, 1924 2 Sheets-Sheet 1

Inventor
Philip Mueller

Aug. 10, 1926.

P. MUELLER 1,595,311

COMBINATION LAVATORY FAUCET

Filed August 21, 1924  2 Sheets-Sheet 2

Inventor

Philip Mueller

Patented Aug. 10, 1926.

1,595,311

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

COMBINATION LAVATORY FAUCET.

Application filed August 21, 1924. Serial No. 733,374.

The present invention relates to water supply fixtures, and has for its object to provide a combination faucet for the delivery of hot and cold water through the usual spout upon manipulation of the hot and cold water cocks, and the manipulation also of a switch cock, the fixture being intended also for hot and cold water supply for a hose connection for a spray nozzle, both the spout connection and the hose connection being under the control of the switch cock which directly diverts the hot and cold water coming from the valves and delivers it either to the spout or to the hose pipe, as may be desired.

The particular object of the present invention is to provide a construction in which the mounting of the switch cock is improved so as to give a larger and more effective operating stem for the switch cock, and an assembly of parts which will permit the ready removal of the switch cock for inspection or repairs.

A further object is to provide means for accurately adjusting and aligning the hose pipe and its supporting standard, so that when the fixture is set up, the various parts may be accurately trued up and brought into proper alignment. This general type of fixture is disclosed in my application for patent, Serial No. 337,482, filed November 12, 1919.

In the drawings herewith I have shown one embodiment of my invention, but it will be understood that mechanical changes may be made without departing from the spirit of the invention, and this showing is merely illustrative, and not restrictive of the invention.

Figure 1:
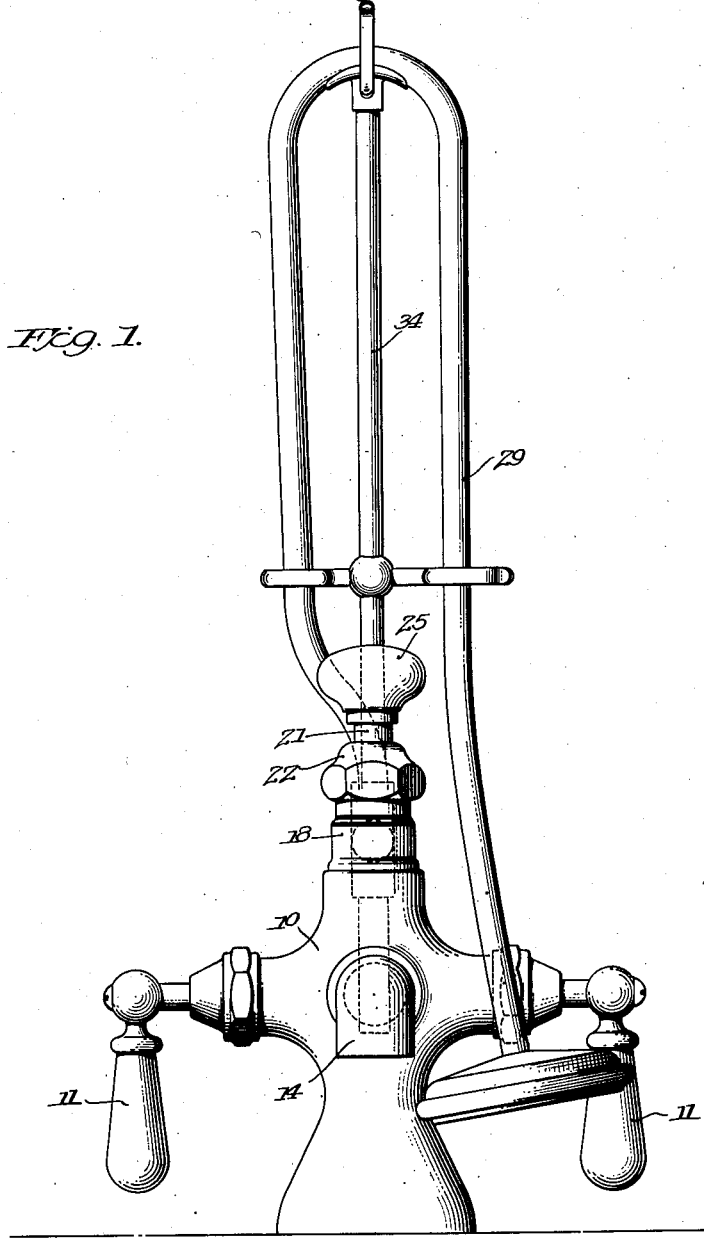
Fig. 1 is a view in front elevation of a fixture embodying my invention.

Referring to the drawings by numbers, like numbers indicating like parts in the several views, 10 denotes the body of the fixture of the faucet which has suitable hot and cold water valves provided with handles 11. As the matter of supply of hot and cold water to the fixture has no part in the present invention, the supply means is not shown or described in detail. The hot and cold water valves control ducts which deliver to the chamber 12, said chamber having two outlets, the outlet 13 delivering to the spout 14, and the outlet 15 delivering to the member 16 of the spray pipe nipple. The outlets 13 and 15 are shown as having the form of cone seats, and are both controlled by the single switch cock 17, as clearly shown in Fig. 2, and as disclosed in my earlier application heretofore referred to.

With this type of fixture, it is necessary to provide a construction in which the switch cock 17 may be readily inserted in and removed from the fixture, and in order that this may be done, I provide the removable casing 18 in the lower end of which the switch cock seat 15 is formed.

Figure 2:
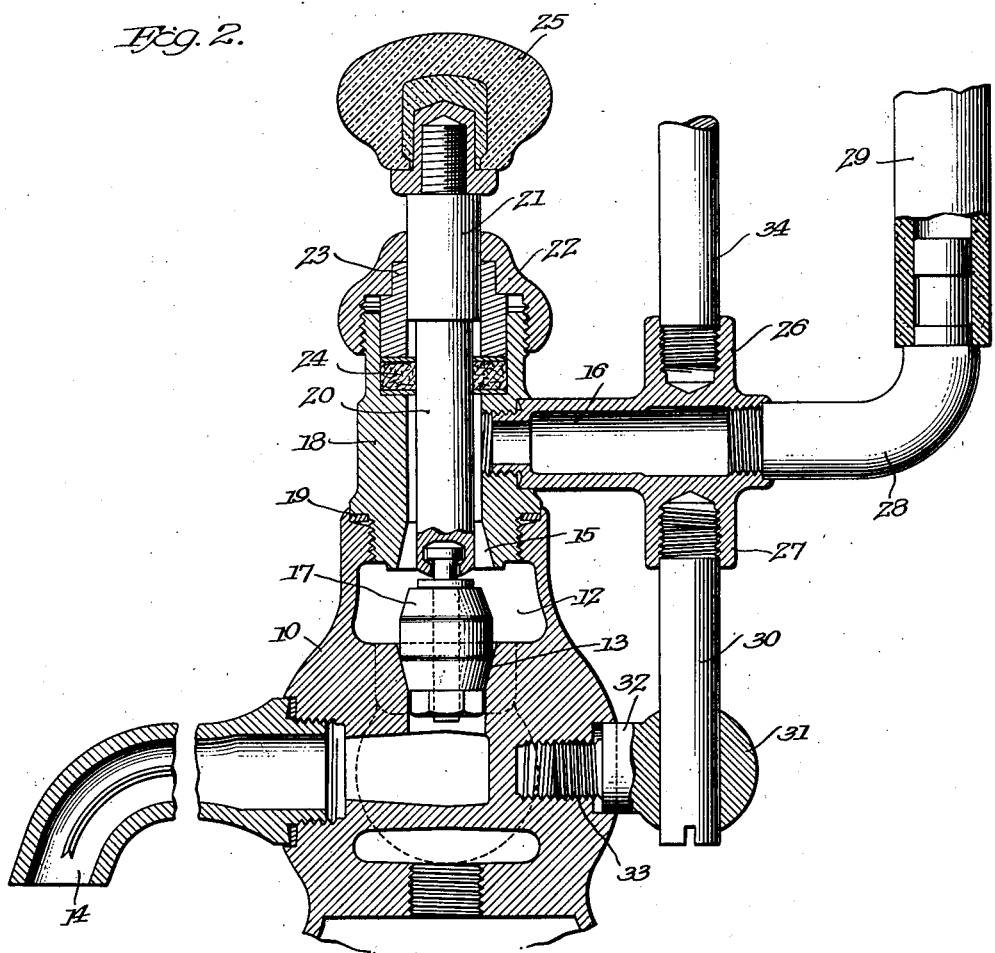
Fig. 2 is a view in vertical section through the fixture taken at substantially right angles to Fig. 1.

The casing 18 is threaded at its lower end and fitted into the top of the faucet body 10, as shown in Fig. 2, a suitable sealing washer 19 preferably of copper coated asbestos being arranged between the parts. The stem 20 for manipulating the switch cock 17 extends through the casing 18, the body of the switch cock having a universal joint connection with the lower end of the stem so that said body may seat properly against the valve seats 13 and 15.

The stem 20 within the passage in casing 18 connecting the chamber 12 and spray pipe 16 is of considerably less diameter than said passage, so as to provide sufficient water-way between the chamber 12 and the spray pipe connection 16. Adjacent its upper end the stem has the enlarged section 21, which reciprocates in the gland nut 22, and sleeve 23 held by said nut, said sleeve being mounted in a counter bore at the upper end of the casing and resting upon a packing 24 positioned at the bottom of said counterbored recess. The packing 24 is made up of a suitable compressible material and metal rings, so that it may be readily compressed to form a tight joint around the reduced portion of the stem 20, without danger of distorting or disintegrating the fibrous element. It will be seen that by turning the gland nut 22, which engages an external thread at the upper end of the casing 18, the sleeve 23, shouldered in to the nut, as shown in Fig. 2, will be forced downwardly so as to give an effective sealing compression to the packing 24. The metal washers at the top and bottom of the packing 24 serve also as guides for the stem 20.

With this arrangement, it will be seen that the enlarged portion 31 of the stem provides a very strong construction, and since it is guided by the washers of the packing 24 and by the nut and sleeve above the packing, the desired vertical alignment of said stem is maintained. The stem is provided at its upper end with any suitable manipulating member, as the knob or handle 25.

The advantage of mounting the parts of the switch cock as described is that they may be readily assembled in the casing 18, and that casing may then be threaded into the body 10 of the faucet.

Where the casing 18 is made separable from the rest of the faucet, and, by reason of its threaded connection, is angularly adjustable thereon, it becomes necessary, or at least desirable, to provide means for ensuring proper alignment of the spray pipe connection 16 and its associated parts. Unless provision is made for this, it might happen that the casing 18 would be screwed into the body portion 10, so as to throw the spray pipe connection 16 to one side, or the other of a central line, and out of alignment with respect to the rest of the fixture.

The means for connecting the spray pipe 29 with the faucet includes a nipple comprising an elbow 28, to which the flexible pipe 29 may be connected in any suitable manner and a connection member 16. The member 16 is threaded into the casing 18, as shown in Fig. 2, a suitable packed joint being provided to effectively seal the connection. The member 16 of the spray pipe connection, as shown, is preferably substantially cruciform in shape, having the threaded lugs 26 and 27 extending at right angles to its length, and being threaded at its outer end to receive the elbow shaped member 28. The lug 27 receives a rod section 30 which is threaded therein, as shown, and suitably shaped at its lower end, as by slotting, to adapt it to be engaged by any suitable tool for connecting or disconnecting it to the lug 27. The lower end of the rod section 30 slides in an adjustable member 31 which has a section 32 extending into an enlarged outer section of a recess 33 formed in the body of the faucet 10. The other end of the member 31 is threaded and engaged with a corresponding thread at the inner reduced end of the recess 33.

With this construction, it will be seen that the spray pipe connection 16 and its associated parts may be trued up as to vertical and horizontal planes, and brought into proper alignment by adjusting the member 31 in or out of the receiving recess, and when once aligned, will be maintained in that proper alignment. The rod section 30, and the member 31 will be coupled to the connection 16, and the adjustment made after the casing 18 has been mounted in the body 10, and the connection 16 has been mounted in the casing 18. When the adjustment has once been fixed, the connection 16 and its associated parts will be held against accidental displacement, either vertically or horizontally.

The plug 26 receives the lower threaded end of the hose pipe support 34, which may be of any suitable type, and provided with suitable clips or hangers to support the hose pipe 29, and its attached spray nozzle when not in use.

The importance of providing means for aligning the spray pipe connection 16 and its associated parts to give a properly fitted up job is apparent, and furthermore, the desirability of ensuring maintenance of a properly aligned condition is obvious.

With the present construction of separable casing and separable spray pipe connection, it will be seen that chances for disalignment of the spray pipe connection 16 horizontally, because of angular movement of the casing 18, and vertically, because of angular movement of the spray pipe connection 16, are always present. With the provision of means for adjustment just described, both horizontal and vertical alignment of the parts can be taken care of, for the plug 27 must be moved horizontally toward or from the faucet body until it comes properly above the aligning member 30, and it must also be turned about a horizontal axis until it is vertically in alignment with the member 30. When this is done, the parts are then set up with respect to a fixed point of alignment, namely, the member 31, and the adjustability of this member 31, as described, gives a flexibility of this fixed point of adjustment to meet slight inaccuracies in the various parts when assembled.

Such changes as are mere mechanical changes and involve the adoption of equivalent expedients for those here shown may be made, and still be within the range of my development.

I claim:—

1. In a fixture of the class described, the combination of a faucet, a removable nipple connected at one end to the body of faucet, and supplemental means connecting the faucet and nipple to maintain said nipple in a predetermined position relative to said faucet.

2. In a fixture of the class described, the combination of a faucet having a delivery spout, a removable nipple connected at one end to the body of the faucet above the plane of the inner end of the spout, and means supplemental to said nipple connection to maintain the nipple in a predetermined position relative to said faucet.

3. In a fixture of the class described, the combination of a faucet having a delivery spout, a removable nipple connected at one end to said faucet above the plane of the inner end of the spout and adjustable means supplemental to said nipple connection to maintain the nipple in a predetermined position relative to said faucet.

4. In a fixture of the class described, the combination of a faucet, a removable nipple connected at one end to said faucet, and vertically and horizontally adjustable means supplemental to said nipple connection to maintain the nipple in a predetermined position relative to said faucet.

5. In a fixture of the class described, the combination of a faucet, a removable nipple connected at one end to said faucet and having a hose connection at the other end, a hose supporting standard carried by said nipple, and an adjustable connection supplemental to said nipple connection adapted to maintain said nipple and standard in a predetermined position relative to said faucet.

6. In a fixture of the class described, the combination of a faucet, a removable nipple connected at one end to the faucet, lugs projecting laterally from said nipple, a hose support mounted on one of said lugs, and a coupling member engaged with the other of said lugs to connect said nipple independently with the faucet and maintain it in a predetermined position relative thereto.

7. In a fixture of the class described, the combination of a faucet, a removable nipple connected at one end to the faucet, lugs projecting laterally from said nipple, a hose support mounted on one of said lugs, a rod engaged with the other of said lugs, and means for coupling said rod to the faucet to maintain said nipple in a predetermined position relative to the faucet.

8. In a fixture of the class described, the combination of a faucet, a removable nipple connected at one end to the faucet, lugs projecting laterally from said nipple, a hose support mounted in one of said lugs, a rod mounted in the other of said lugs, and adjustable means for coupling said rod to the faucet to maintain said nipple in a predetermined position relative to the faucet.

9. In a fixture of the class described, the combination of a faucet, a removable nipple threaded at one end to the faucet and having a hose receiving connection at its other end, a lug projecting laterally from said nipple, a hose support threaded in said lug, a second lug projecting from said nipple, a rod threaded in said second lug, and an adjustable rod receiving member mounted on the faucet to maintain said nipple and its supported parts in a predetermined position relative to the faucet.

10. In a fixture of the class described, the combination of a faucet, a removable nipple connected at one end to the faucet, a hose support extending laterally from said nipple, an aligning member extending laterally from said nipple, and means for coupling said aligning member to a fixed part to align and maintain said nipple and its supported parts in a predetermined position relative to the faucet.

11. In a fixture of the class described, the combination of a faucet, a removable nipple connected at one end to the faucet, a hose support extending laterally from said nipple, an aligning member extending laterally from said nipple, and adjustable means for coupling said aligning member to a fixed part to align and maintain said nipple and its supported parts in a predetermined position relative to the faucet.

12. In a fixture of the class described, the combination of a faucet, a removable nipple connected at one end to the faucet, a hose support extending laterally from said nipple, an aligning member extending laterally from said nipple, and adjustable means to couple said aligning member to the faucet and align and maintain said nipple and its supported parts in predetermined position.

13. A spray nipple for faucets comprising a substantially cruciform shaped body portion adapted to be connected at one end to a faucet, a hose receiving section connected to the other end of said nipple, a hose support connected to one of the arms of said cruciform-shaped body portion, and an aligning rod connected to the other arm of said cruciform-shaped body portion.

14. A spray nipple comprising a substantially cruciform-shaped body portion having an exteriorly threaded end adapted to be coupled to a faucet, a substantially L-shaped hose receiving section interiorly threaded to the other end of said body portion, a hose support threaded to one of the arms of said cruciform-shaped body portion, and an aligning rod threaded to the other arm of said cruciform-shaped body portion.

15. In a fixture of the class described, the combination of a faucet, a removable nipple connected at one end to the faucet, a nipple aligning member extending laterally from said nipple, and adjustable means countersunk and threaded into the body of the faucet engaging said aligning member.

16. In a fixture of the class described, the combination of a body having therein a mixing chamber that opens through the top thereof, hot and cold water cocks controlling supply conduits leading to said chamber, a spout communicating with the mixing chamber, a casing having its lower end connected by a suitable thread with the upper end of the body so that said casing forms an upward extension of the mixing chamber, a spray pipe nipple extending laterally from said casing, adjustable means connecting said nipple with the body of the fixture to maintain the nipple and casing in a predetermined relation to the body, and a switch cock controlling the flow of water from the mixing chamber to either the spout or the spray pipe nipple.

In testimony whereof I have hereunto set my hand.

PHILIP MUELLER.